United States Patent
Laskowski et al.

(10) Patent No.: US 6,702,375 B1
(45) Date of Patent: Mar. 9, 2004

(54) ACTIVITY CENTER FOR A VEHICLE

(75) Inventors: Michael J. Laskowski, Livonia, MI (US); Ronald R. Siegrist, Grass Lake, MI (US); Lance E. Larsen, Southfield, MI (US); Neil J. Bush, Pinckney, MI (US); Roger A. Whitley, Brighton, MI (US); Daniel J. Koester, Ann Arbor, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 24 days.

(21) Appl. No.: 09/796,032

(22) Filed: Feb. 28, 2001

Related U.S. Application Data

(60) Provisional application No. 60/185,613, filed on Feb. 29, 2000.

(51) Int. Cl.[7] .................................................. A47C 7/62
(52) U.S. Cl. .............................. 297/188.07; 297/283.1; 273/236; 273/242; 273/260
(58) Field of Search ........................ 297/188.07, 188.01, 297/163, 188.04, 146, 125, 217.1, 135, 283.1, 283.3; 108/44, 25; 312/223.3; 446/85, 87, 487; 273/236, 240, 242, 243, 244, 244.2, 260, 270, 276, 282.1, 285, 290

(56) References Cited

U.S. PATENT DOCUMENTS

| | | | | |
|---|---|---|---|---|
| 3,741,544 A | * | 6/1973 | Wolff, Jr. ................... 273/95 E |
| 5,088,678 A | * | 2/1992 | Bitan ......................... 248/460 |
| 5,303,976 A | * | 4/1994 | Nobile et al. ................ 297/146 |
| 5,460,102 A | * | 10/1995 | Pasmanick .................... 108/43 |
| D368,189 S | * | 3/1996 | Bro et al. ..................... D6/480 |
| 5,509,844 A | * | 4/1996 | Poirier et al. ............. 108/43 X |
| 5,788,324 A | * | 8/1998 | Shea et al. .......... 297/188.04 X |
| 5,800,182 A | * | 9/1998 | Carson et al. ............... 434/430 |
| 5,878,672 A | * | 3/1999 | Ostermann et al. . 297/188.06 X |
| 5,966,285 A | * | 10/1999 | Sellers ........................ 361/686 |
| 6,053,585 A | * | 4/2000 | Osen ........................... 312/204 |
| 6,059,358 A | * | 5/2000 | Demick et al. ......... 297/188.04 |
| 6,065,751 A | * | 5/2000 | Armstrong ................... 273/271 |
| 6,173,656 B1 | * | 1/2001 | Blanchard .................... 108/43 |
| 6,199,948 B1 | * | 3/2001 | Bush et al. ......... 297/188.04 X |
| 6,220,660 B1 | * | 4/2001 | Bedro et al. ........... 297/188.04 |
| 6,267,374 B1 | * | 7/2001 | Bourbeau ................... 273/236 |
| 2002/0060481 A1 | * | 5/2002 | Jones .................... 297/188.04 |
| 2003/0122392 A1 | | 7/2003 | Larsen et al. |

* cited by examiner

*Primary Examiner*—Peter M. Cuomo
*Assistant Examiner*—Stephen Vu
(74) *Attorney, Agent, or Firm*—Foley & Lardner

(57) ABSTRACT

An activity center for a vehicle includes a base defining a storage area and a panel having first and second surfaces. The base is connected to the rear surface of a vehicle seat back. The panel, in turn, is connected to the base for movement between a closed position, which prevents access to the storage area and an open position which allows access to the storage area. The panel is also preferably coupled to the base so that either the first or second surface thereof may face away from the base. The two surfaces of the panel may be configured for a wide variety of educational, entertainment or work-related uses.

13 Claims, 8 Drawing Sheets

ACTIVITY CENTER FOR A VEHICLE

CROSS-REFERENCE TO RELATED APPLICATIONS, IF ANY

This application claims priority from Provisional Patent Application No. 60/185,613 filed Feb. 29, 2000, and having the same title as indicated above.

BACKGROUND OF THE INVENTION

1. Field of the Invention

The present invention relates generally to accessories for vehicles, and more specifically to an activity center which may be connected to the rear surface of a folding seat back that provides an organizational compartment and a horizontal surface for use in educational, entertainment, or work related applications.

2. Description of the Prior Art

The addition of components or accessories to vehicles to make the time spent in them more enjoyable or useful is an important part of vehicle design. For example, it would be highly desirable to have educational or entertainment components added to vehicles to make long-distance travel with young children more enjoyable. Parents have previously entertained children in the rear seats of vehicles with small toys, books and the like, the organization of which, together with snack foods and drinks, all present the opportunity for clutter and inconvenience.

Several products are known which attempt to solve this or related problems, including a fold-down auto office described in U.S. Pat. No. 6,059,358, issued May 9, 2000, to Demick et al. In this device, a cover is provided for a recessed storage area within a seat back, the cover being hinged to allow access to the storage area. The seat back may be rotated forwardly to a horizontal position. The auto office system of this patent includes various pouches and implement holders on the inside of the cover and a laterally extending support panel which can be used for a notepad or with a cellular telephone.

Activity centers of several types are illustrated and described in U.S. patent application Ser. No. 09/168,643, filed in the name of Bedro et al., on Oct. 8, 1998. In one embodiment of this patent, an activity center is provided in the back of a forward section of a seat back which folds downwardly so that the activity center is located between two seating positions. In a preferred embodiment, a four-bar linkage and a gas cylinder are used to bias the activity center to an elevated level, and panels are rotated laterally so that each of two occupants may have a platform located over his or her lap. Several different embodiments are shown for providing the movement of the platforms into the appropriate position, and the platforms may be variously configured, including providing raised studs for Lego® blocks or writing surfaces.

In another embodiment of the activity center shown in the Bedro et al. application, the activity center is located in the rear surface of the front passenger seat of a vehicle. It includes a similar linkage to open it to provide both a forwardly extending and a laterally extending planar surface. In both embodiments, a base may be provided for storage of items such as Lego® blocks, pens, pencils, markers, small toys, work tools, etc.

While the aforementioned auto office and activity centers, and other components and accessories known in the art, are generally useful for their intended purposes, they may require more components and assembly time and cost than is desirable for some applications. It would be a significant advance in this art to provide an activity center which would be easy to manufacture and to install, easy to use, and which would provide a plurality of organizational, educational, entertainment and work-related features.

SUMMARY OF THE INVENTION

A primary feature of the present invention is to provide an activity center for a vehicle seat back which may be constructed and installed in a wide variety of vehicles.

Another feature of the present invention is to provide an activity center for a vehicle which provides at least two planar surfaces which may be used for entirely different end uses.

A different feature of the present invention is to provide an activity center for a vehicle which may be used when the seat is folded forwardly so that the rear of the seat back is generally parallel to a seat cushion.

Yet another feature of the present invention is to provide an activity center for a vehicle in which the exterior surface of a panel may be easily altered by the vehicle owner.

Another feature of the present invention is to provide a vehicle activity center which may be modularized so that it may be removed from the seat back, whereby its organizational, entertainment, educational and/or work-related benefits may be realized at a location remote from the seat back itself.

A still further feature of one embodiment of the invention is to provide a panel that may be reversed without removing it from the base.

How these and other features of the invention are accomplished will be described in the following detailed description of the preferred and alternate embodiments, taken in conjunction with the drawings. Generally, however, they are accomplished individually, collectively, or in various sub-combinations by an activity center which includes a base which may define a storage cavity and a panel having first and second surfaces. The base is connected either permanently or removably to the rear surface of a seat back. The panel is connected to the base for movement between a closed position in which access to the storage area is prevented and an open position which allows access to the storage area. The panel is also preferably connected to the base in such a manner that it may be selectively positioned so that a first surface thereof points away from the storage area or a second position wherein the second surface points away from the storage area. The first and second surfaces may be provided with entertainment features, such as raised studs which can engage Lego® blocks, or a checkerboard design, or a drawing board such as a magnetic particle drawing board, or a dry erase marker board, etc. These activity centers provide entertainment for small children. Alternatively, the panel surfaces can be used for supporting computers or other work-related, entertainment or educational devices, while the storage area provides a place in which one or a plurality of articles may be stored to reduce clutter and facilitate organization within the vehicle.

In one embodiment, the panel is hinged to the base along its bottom edge and held in its closed position by a latch engaging the opposite edge. In another embodiment, the panel is retained in a mount which is pivotally joined to the base. The interchangeability of the panel surfaces is accomplished in this embodiment by a sliding engagement of the panel with the activity center.

In an especially preferred embodiment, the panel may be reversed without removing it from the base, such as by the use of pins extending from either side of the panel adjacent one end thereof, the pins sliding in tracks located along the edges of the base.

In a further embodiment, any of the above-mentioned styles of activity centers may be removably connected to the seat back so that the storage area, as well as the platform may be removed and used within or outside of the vehicle.

Other ways in which the features of the invention are accomplished will become apparent to those skilled in the art after they have read the following description, and such other ways are deemed to fall within the scope of the present invention if they fall within the scope of the claims which follow.

BRIEF DESCRIPTION OF THE DRAWINGS

Further features and advantages of the invention will become apparent from the following drawings in which like reference numerals are used to indicate like components, and.

DETAILED DESCRIPTION OF THE PREFERRED AND ALTERNATE EMBODIMENTS

Before proceeding to a detailed description of the preferred and alternate embodiments, several general comments can be made about the applicability and the scope of the present invention.

First, two panel surfaces are shown in the FIGURES, namely a platform which includes a plurality of raised studs which may be used with Lego® blocks, and a checkerboard surface. The panel may be variously embodied for a wide variety of entertainment, educational, organizational and/or work applications, some examples of which include providing a dry erase marker surface on the panel, providing a drawing surface such as those which use magnetic particles located between a transparent film cover and the panel surface and a magnetic writing implement, other types of game boards, clipboard surfaces which may be used to hold writing tablets, surfaces covered with either hook or loop fastening components of the Velcro® type which may be used with other articles such as a laptop computer to prevent it from moving during acceleration and braking of the vehicle, etc.

Second, the activity center of the present invention is designed for use when the seat back is rotated, folded or otherwise moved to a horizontal position from its normal passenger position. In its use position, the seat back is generally parallel to the seat cushion. This may occur with the front passenger seat, in second or third row bucket, bench or captain seats, in the center section of a 40/20/40 seat arrangement in which two seating positions are located on either side of a center section having a separate seat back, etc.

Third, several preferred latching and hinge techniques are illustrated in the FIGURES, but other types of latches and hinges may be substituted therefor without departing from the invention's intended scope.

Fourth, other convenience features can be incorporated in the activity center in addition to the panel surfaces previously discussed, e.g. cup holders or storage areas for such items as sunglasses, garage door openers, video or DVD remote controllers, discs, tapes and the like. Cup holders are shown in the FIGURES, but they are there for purposes of illustration only, rather than limitation.

Fifth, the particular materials used for the activity center of the present invention can also be widely varied. In the preferred embodiment, the base is constructed from a moldable resin and is surrounded by an elastomeric bumper. The panel material is preferably rigid and can be made of plastics. Other resin, metal, metal alloy, fabric and fiber components could be used.

In the alternate embodiment relating to a removable activity center, a variety of fastening techniques may be used to attach the activity center to the vehicle. These include the use of Velcro® fasteners on both the seat back and the activity center, snap fasteners, zipper fasteners, etc.

Figure 1:
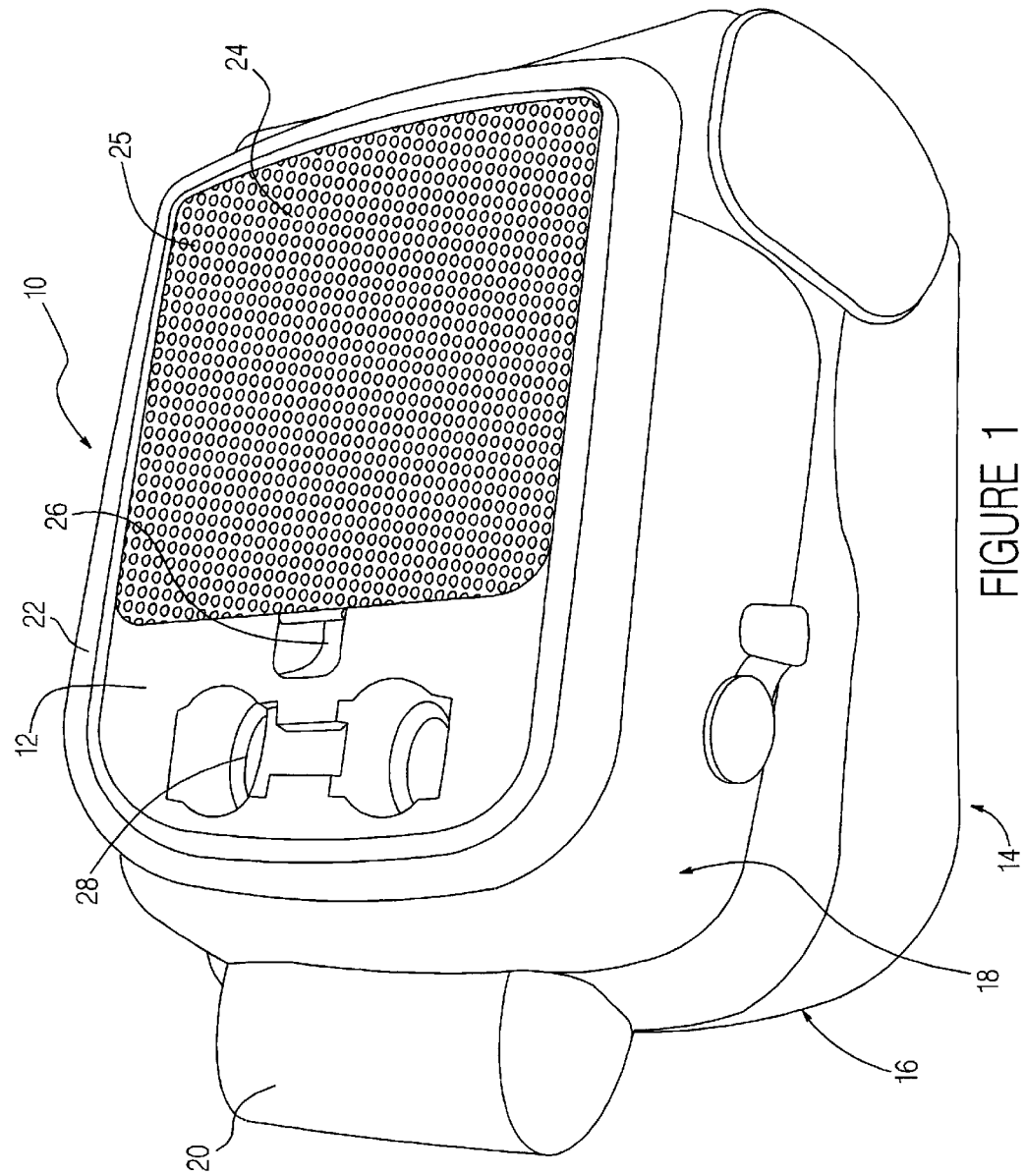
FIG. 1 is a perspective view of an activity center of a first preferred embodiment of the invention, with the panel in its closed position.

Proceeding now to a description of the FIGURES, FIG. 1 shows an activity center assembly 10 according to one embodiment of the invention. The activity center 12 is located on a seat assembly 14 including a seat cushion 16 and a seat back 18. The seat back 18 includes a headrest 20.

Activity center 12 is shown in this FIGURE to include a rim 22, preferably made from an elastomeric material, and a panel 24. Panel 24, in this embodiment, includes a pattern of regularly spaced, round studs 25 used for attaching Lego® blocks. The panel 24 is shown in a closed position, but it may be moved to an open position (described in later FIGURES), by activation of latch 26. The activity center 12 also includes a pair of cup holders 28, which, as indicated previously, are optional.

Figure 2:
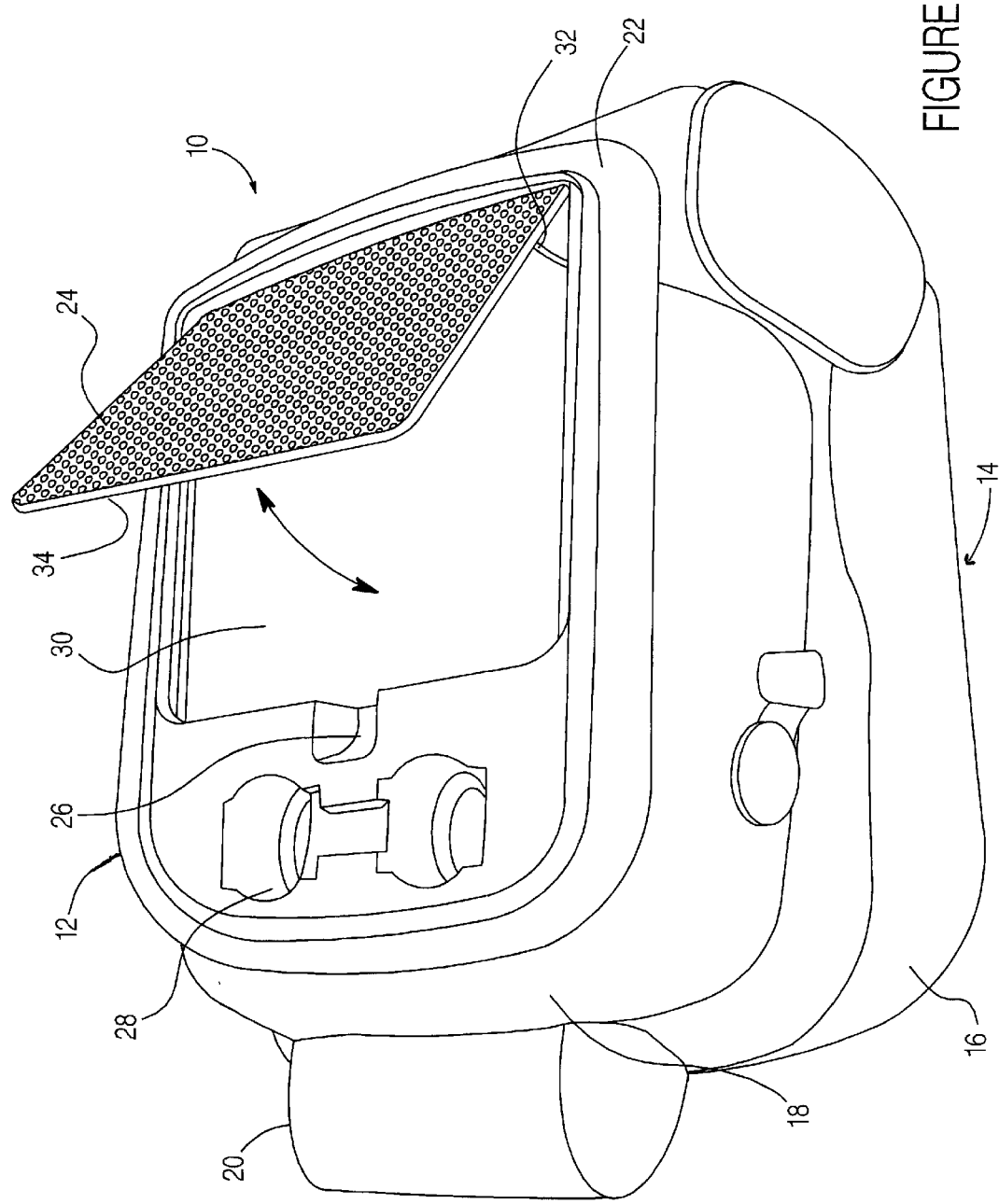
FIG. 2 is perspective view of the activity center of FIG. 1, with the panel in an extended position.

FIG. 2 shows the activity center assembly 10 of FIG. 1, with the panel 24 in its open position, such as by pivoting it around hinge 32. Panel 24, when open, allows access to a storage area 30 therebeneath. The volume and shape of the storage area 30 may be varied widely and will depend upon the depth of the seat back 18 and the types of activities to be conducted using activity center 12. In its preferred embodiment, the hinge 32 will allow rotation of the panel 24 about an angle from about 30 to about 90 degrees. It is also preferable that hinge 32 permit removal of panel 24 for reasons which will soon become apparent in connection with the description of FIG. 3. This may be accomplished by providing slots in the hinge mechanism to receive panel 24.

Figure 3:
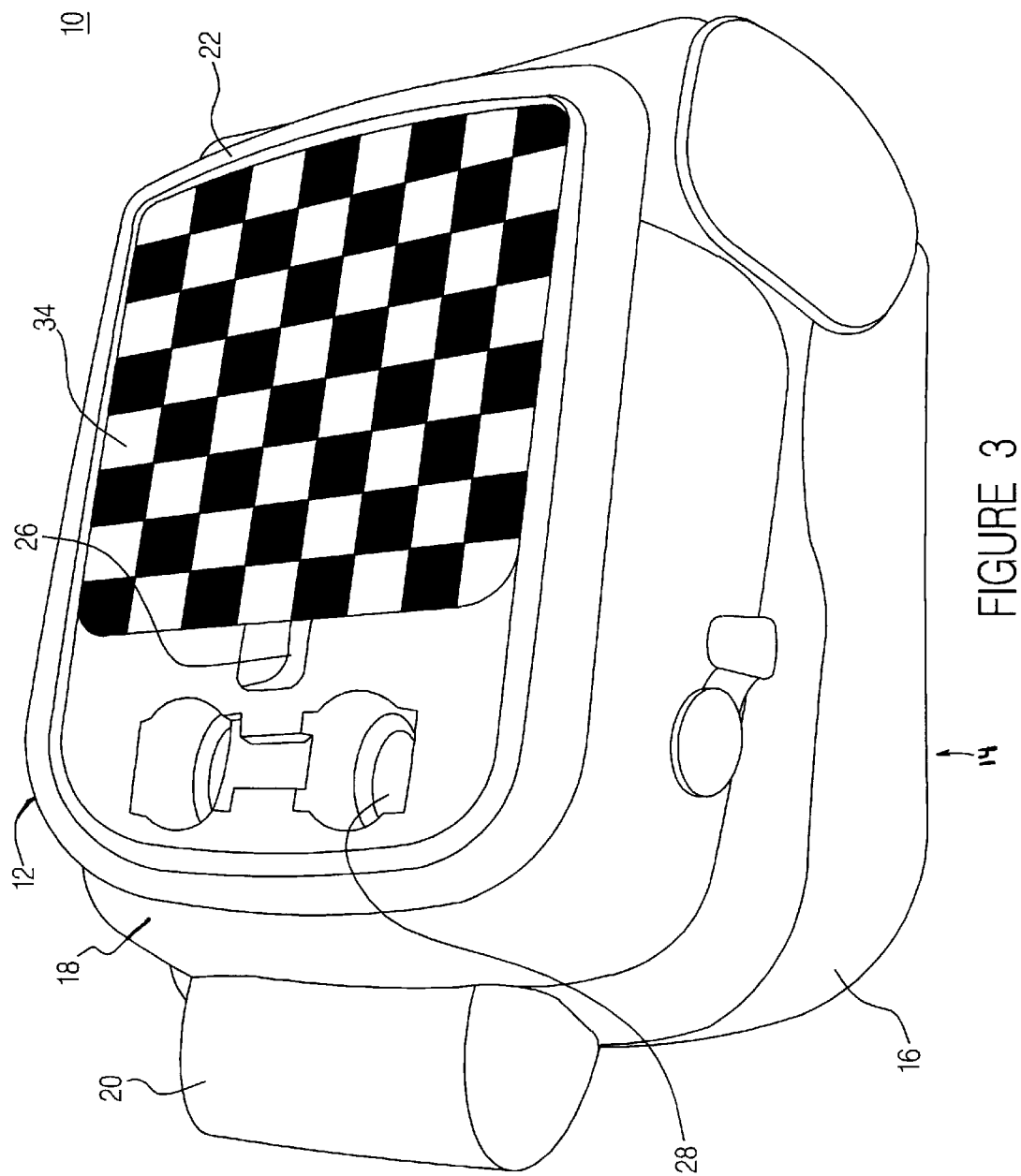
FIG. 3 is a perspective view of the activity center of FIG. 1, with the rear surface of the panel pointing away from the storage area.

In FIG. 3, the panel 24 has been reversed to expose a rear surface 34. In the illustrated embodiment, surface 34 comprises a checkerboard pattern useful for checkers and chess. Panel 24 is shown again in its closed position, in which access to storage space 30 is prevented.

Figure 4:
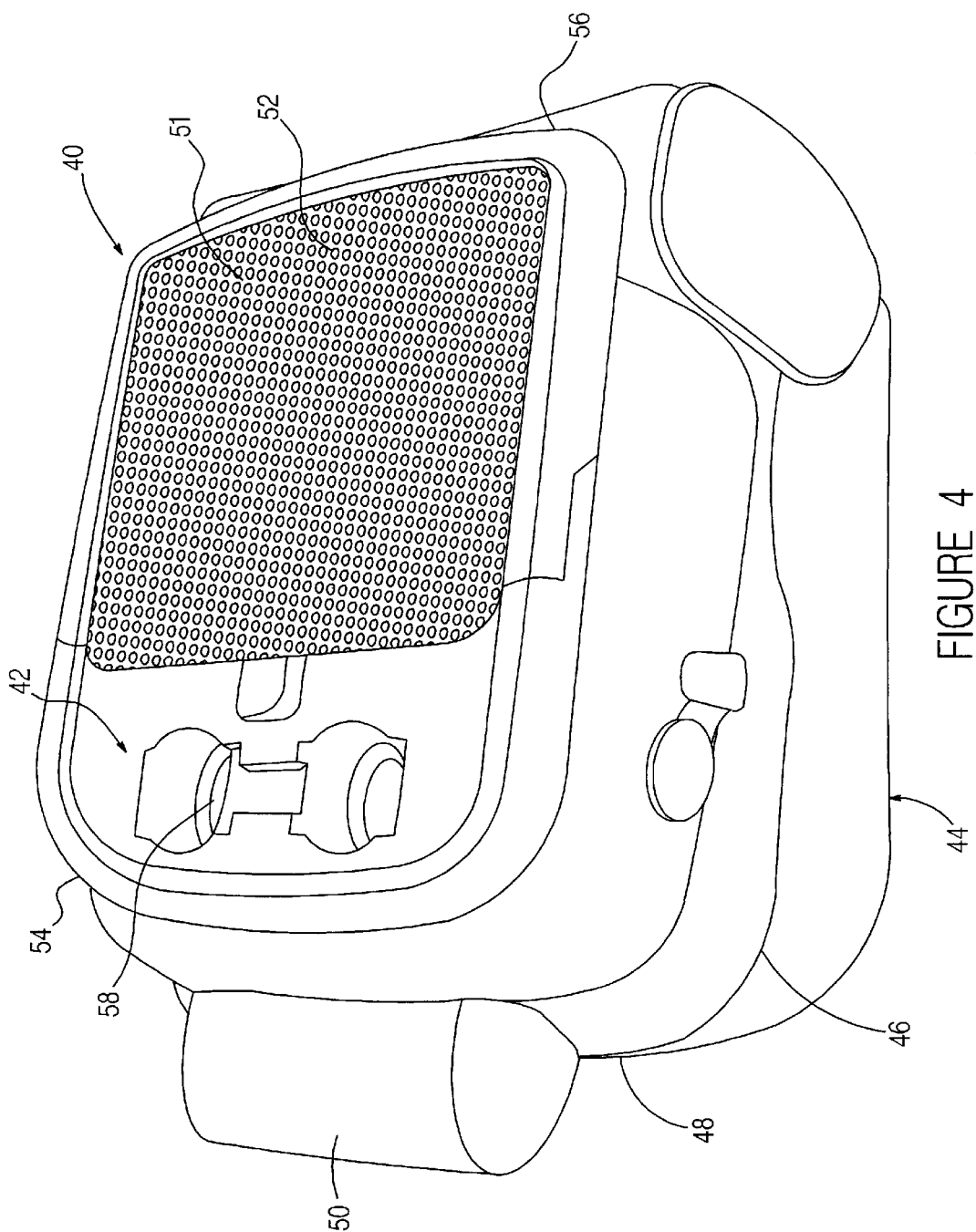
FIG. 4 is a perspective view of an activity center of a second preferred embodiment of the invention with the panel in its closed position.

A second activity center and seat assembly 40 are shown in FIG. 4, the activity center itself being illustrated at reference 42. Activity center 42 is coupled to a seat 44 having a cushion 46, a seat back 48 having a headrest 50. This activity center also includes a panel 51, illustrated as including a plurality of studs 52 to be used with Lego® blocks. The difference between this embodiment and the first embodiment is that FIG. 4 shows a two-part bumper arrangement including a first portion 54 affixed to the seat back 48 and a second portion 56 which may be pivoted about a hinge (see FIG. 5) to allow access to the storage area of activity center 42. The bumper portion surrounding the lower portion of the platform is indicated at reference numeral 56.

Figure 5:
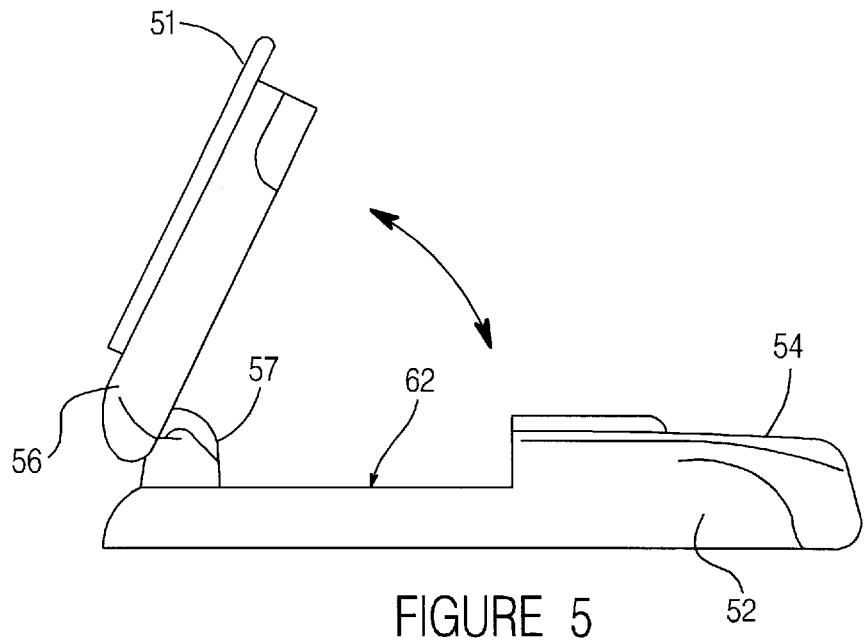
FIG. 5 is a side view of the activity center of FIG. 4, without any seat components, and with the mount in its open position.
Figure 6:
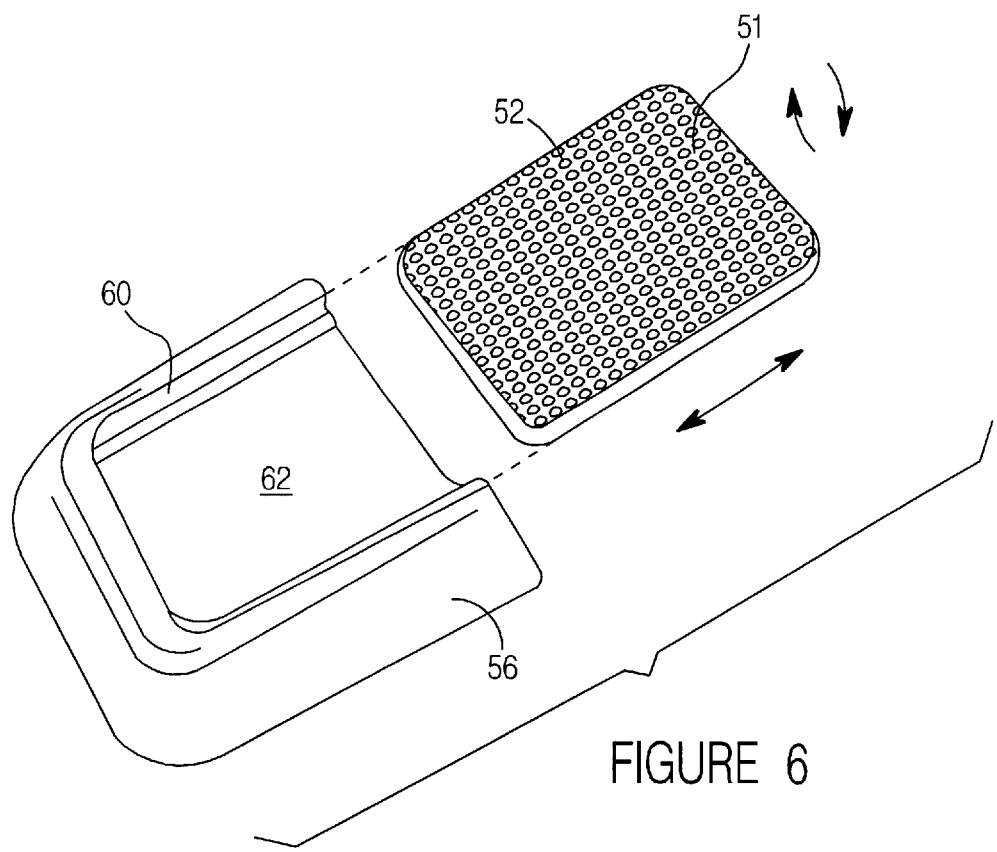
FIG. 6 is a partial view of the activity center of FIGS. 4 and 5, with the panel shown removed from the mount.

As is explained in greater detail in connection with FIGS. 5 and 6, from which the seat components have been removed for ease of explanation, the activity center 42 includes an interior 62 for storage and/or organization of items. Moreover, the hinges 57 allow pivoting of bumper section 56. A track 60 is formed around three sides of bumper portion 56 and acts to receive panel 51 therein. As diagrammatically illustrated in FIG. 6, panel 51 may be moved into and out of track 60 and may be reversed so that its inner side 53 may face outwardly. Bumper section 56 may be held in place in any convenient manner, including various releasable fasteners, latches or the like.

Figure 7:
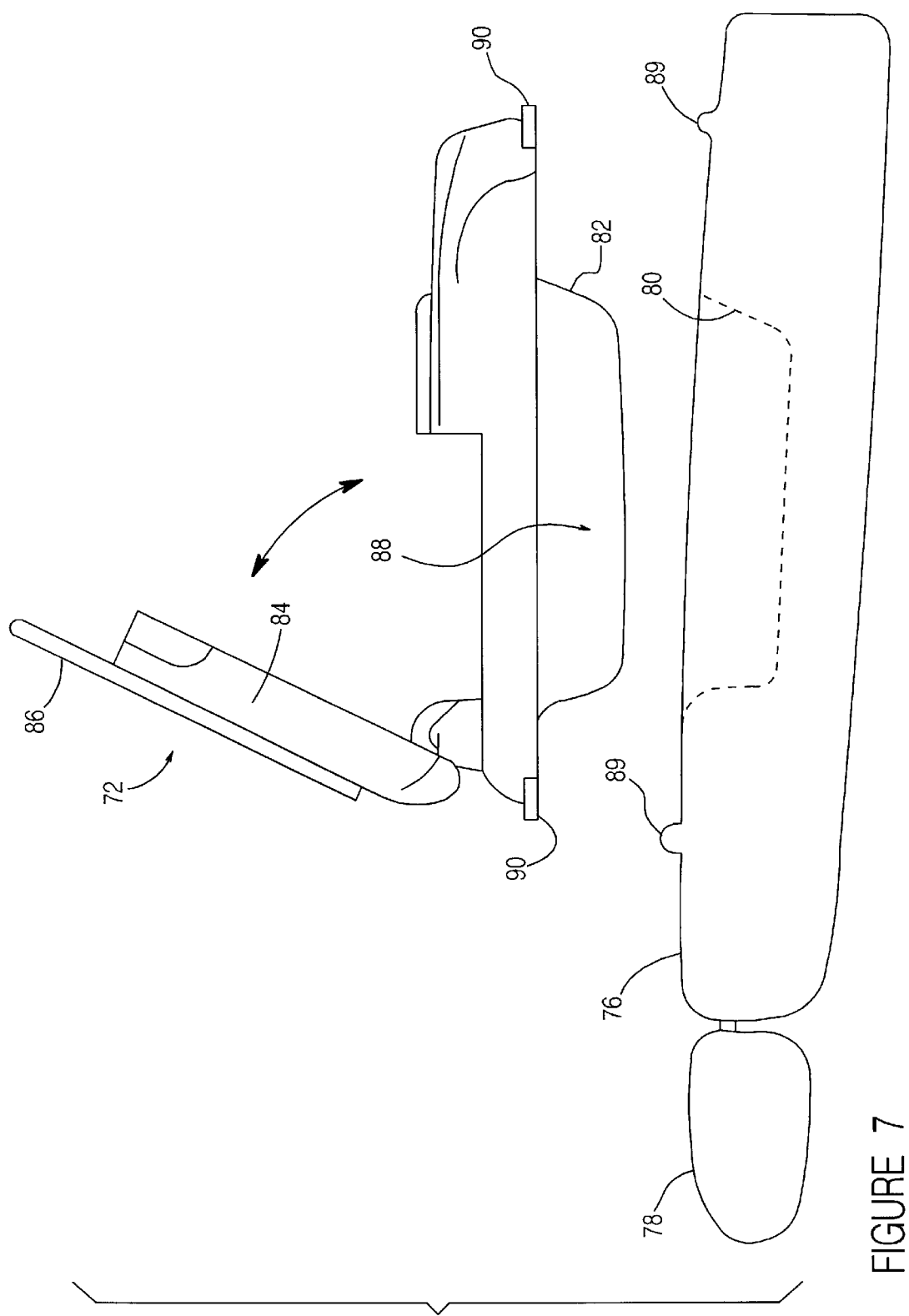
FIG. 7 is a side, schematic view of an activity center of a third preferred embodiment of the invention shown detached from a receptacle located on a seat back.

A second alternate embodiment of the invention is illustrated in FIG. 7. This embodiment includes a removable activity center 72 which may be selectively coupled to a seat back 76, which in turn includes a headrest 78. A receptacle 80 is provided in seat back 76 and a base portion 82 of the activity center 72 is constructed and arranged to mate with receptacle 80. The activity center itself is similar to that illustrated in FIGS. 4–6 and includes a pivoted bumper area 84 containing a slidably removable and reversible panel 86. The interior storage area is indicated at reference numeral 88.

The attachment of activity center 72 to seat back 76 can be carried out in a number of different ways, including the use of hook and loop fasteners on the receptacle 80 and base 82, respectively, or as illustrated, a plurality of fasteners 89 on the seat back mate with receptacles 90 located on activity center 72. These connections may be snap fasteners, for example.

Figure 8:
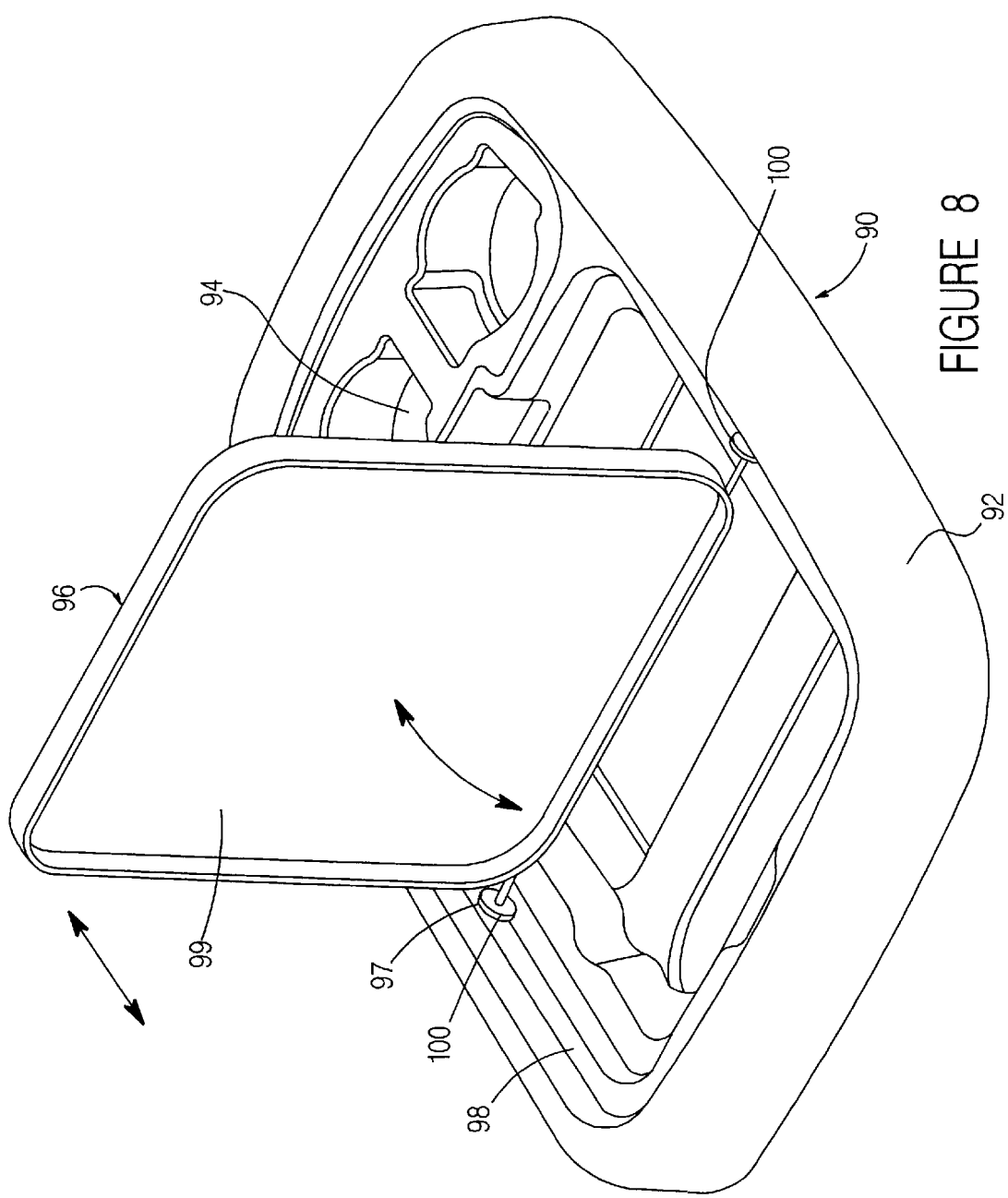
FIG. 8 is a perspective view of another embodiment of the invention in which pins extended from either side of the panel near an end thereof, the pins travelling in tracks in the base to accomplish reversal of the panel.

A third alternate embodiment of the invention is illustrated in FIG. 8 (the seat components are not shown). Activity center 90 is shown to include a base 92, cup holders 94 and a panel 96 shown in an open position in which it is generally vertical to the base 92. Panel 96 includes a pair of pins 97 extending outwardly from panel 96 at a first end thereof, the pins having their free ends located within tracks 98 which extend along the two longer edges of base 92 and which are spaced upwardly from the bottom of base 92.

It will be appreciated that if panel 96 is moved toward the cup holders 94 and then lowered to a position in which it is generally horizontal with respect to base 92, a first surface (not visible in FIG. 8) will be exposed. On the other hand, if panel 96 is moved to a location in which the pins 97 are remote from cup holders 94, the face 99 of panel 96 which is visible in FIG. 8 will be in a use position when panel 96 is lowered to a horizontal position. Any suitable type of latch may be used to hold panel 96 in a use position, such as spring-loaded latches or the type of rotatable latches used to hold tray tables on the backs of airplane seats. The pins may be spring loaded for insertion thereof into tracks 98, or the pins 97 may be rigidly attached to platform 96.

Figure 9:
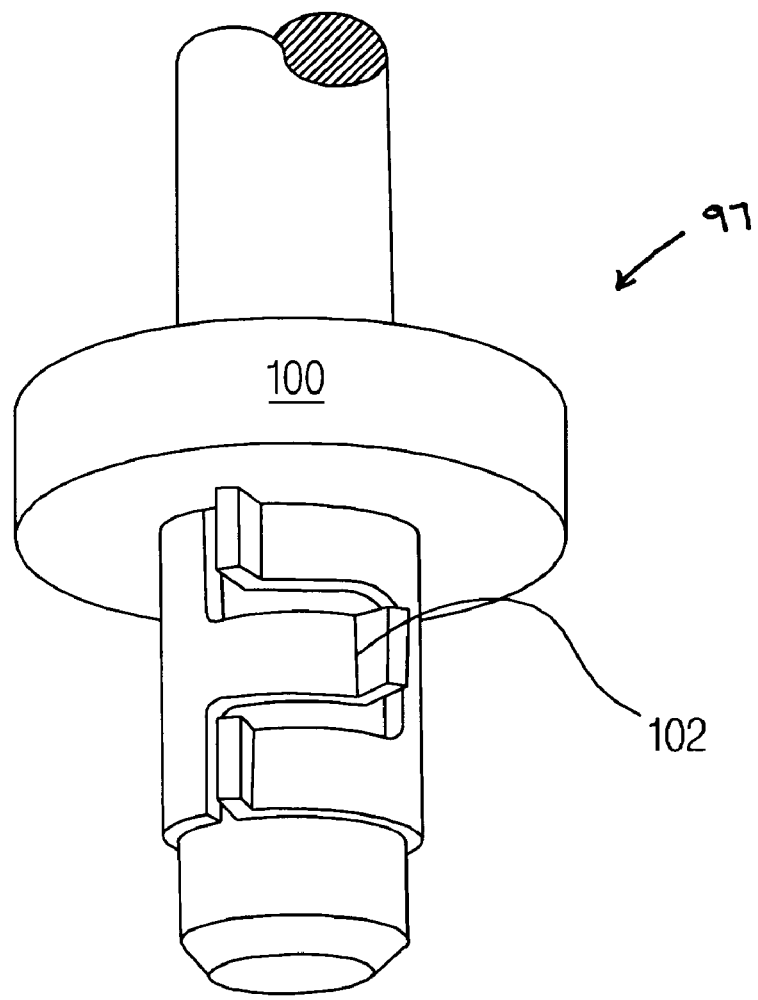
FIG. 9 shows an enlarged view of the end of one of the pins shown in FIG. 8, and illustrating an annular flange coupled to the end thereof.

FIG. 9 shows an enlarged view of one technique for constructing the pin in which an annular flange is attached at a location near the end of the pin 97, the flange being referenced at 100. An integral, collar, spring clip 102 is used to affix flange 100 at the desired location. The surface of flange 100 facing the track 98 of the base 92 facilitates movement of the panel 96 with respect to the base 92. Other shapes of flanges and methods of attachment may also be substituted for those shown.

As explained at the beginning of this portion of the specification, the types of panels and the way in which they are attached to the seat back may be variously embodied. Three examples have been shown but others will appear to those skilled in the art after they have read this specification. Other attachment techniques and configurations for the panels themselves may appear to those individuals skilled in the art and are deemed to fall within the scope of the present invention if they fall within the scope of the claims which follow.

What is claimed is:

1. An activity center for a vehicle comprising:
   a vehicle seat assembly adapted to be coupled to a vehicle frame, the vehicle seat assembly having a seat cushion and a seat back that pivots with respect to the seat cushion;
   a base of the activity center affixed to the rear of the seat back;
   a reversible panel coupled to the base;
   a storage area defined at least in part by the base and a surface of the panel;
   the panel being movable between an open position wherein the storage area is accessible and a closed position wherein access to the storage area is prevented; and
   the panel having first and second surfaces and being coupled to the base in a manner which allows either the first or second surface of the panel to face away from the base when the panel is in the closed position, as determined by a user of the activity center.

2. The activity center of claim 1, wherein the base is removably coupled to the vehicle seat back whereby the activity center may be used in association with the seat back or at a location spaced apart therefrom.

3. The activity center of claim 2, wherein the seat back includes a receptacle adapted to receive the base.

4. The activity center of claim 1, wherein each of the first and second surfaces of the panel are selected from the group consisting of surfaces that are educational, entertainment, and work related.

5. The activity center of claim 1, wherein the panel is hinged to the base to allow the panel to move between its open and closed positions.

6. The activity center of claim 1, wherein the base includes a track, open at one end for slidably receiving the panel.

7. The activity center of claim 6, wherein the panel may be slidably removed from the track for use at a location remote therefrom and may be rotated so that either the first or second surface faces away from the base.

8. The activity center of claim 1, wherein an elastomeric bumper surrounds at least a portion of the panel.

9. The activity center of claim 1, wherein the first and second surfaces are selected from the group consisting of a stud surface usable with Lego® blocks, a game board surface, a drawing surface, and a surface formed of hook and loop fastener materials.

10. The activity center of claim 1, wherein the panel forms a portion of a generally planar surface of the activity center and wherein at least one beverage holder is provided at a location proximate to the panel.

11. The activity center of claim 1, wherein the vehicle seat is foldable so that its rear surface may be selectively placed in a generally vertical or a generally horizontal orientation.

12. The activity center of claim 1, wherein the base includes a pair of elongate, closed end tracks on opposed sides thereof and the panel includes a pair of pins adjacent an end thereof, the pins being arranged to travel in the tracks to permit interchange of the panel surfaces without removal thereof from the base.

13. The activity center of claim 12, wherein the pins each include a flange spaced inwardly of the free ends of the pins.

* * * * *